Patented Aug. 24, 1948

2,447,814

UNITED STATES PATENT OFFICE 2,447,814

SYNTHESIZING VITAMINS IN STILLAGE

Arthur F. Novak, Louisville, Ky., assignor to Joseph E. Seagram & Sons, Inc., Shively, Ky., a corporation of Indiana No Drawing. Application November 11, 1943, Serial No. 509,935

8 Claims. (Cl. 195—42)

Distillery solubles, i. e., the solids of thin distillery slop. are largely in solution and in suspension. While they command a premium as a feed stuff because of their enhanced food value, they are difficult to recover, in dry form, by means other than complete evaporation which is somewhat expensive since, normally, more than 960 pounds of water must be evaporated out of each 1.000 pounds of thin distillery slop to recover less than 40 pounds of dry solubles. As a general rule, the slop, and the dry solubles derived from it, lack the vitamin B-complex so essential to normal animal growth; hence the solubles constitute a feed supplement as distinguished from a complete feed ration. The only known exception to this rule is the slop obtained from a carbohydrate mash which has been fermented by a butyl alcohol producing bacteria. The Miner Patent #2,202,161 points out that such bacteria synthesizes large quantities of the vitamin B-complex in the mash during the butyl alcohol-producing fermentation operation and that such vitamins are preserved in the solubles during the butyl alcohol-recovery and feed-recovery operations.

Where distillery slop is deficient in vitamins, and particularly those of the B-complex, as in the case of ethyl alcohol fermentation in making whiskey, it is desirable to correct this deficiency. But it is not economical to do so by physically incorporating vitamins derived from outside sources into either the stillage or the dried solubles. Alternatively there remains the possibility of synthesizing vitamins in deficient stillage by means of a microorganism, and the accomplishment of this possibility forms the principal object of this invention.

The microorganisms available are molds, yeasts, and bacteria. Molds do not appear to be satisfactory since they are difficult to handle industrially, are easily contaminated, and are too slow in growth to be practical for economical production purposes. Since the yeasts, used in various fermentation processes from which stillage is derived, do not function to increase the vitamins to any noticeable extent, they likewise do not appear promising. As for bacteria, an extensive survey of the literature fails to indicate any suitable process for synthesizing vitamins in stillage. There is a speculative possibility that butyl alcohol producing bacteria may be employed to synthesize vitamins in deficient stillage. The use of such bacteria, however, would appear to have the disadvantage of requiring the addition to the stillage of a nutrient medium for the bacteria such as a carbohydrate. Furthermore, in plants where butyl alcohol producing bacteria is a contaminating agent, as it would be in whiskey distilleries, its use in the plant, being fraught with the danger of contamination, would be undesirable, while its use in feed recovery equipment safely away from the plant would have the disadvantage of entailing substantial haulage costs. Under the circumstances, therefore, it seems accurate to say that up to the present time there is no known method for synthesizing vitamins in deficient stillage by means of bacteria. The provision of such a method forms another important object of this invention.

I have found that bacteria can be economically used in stillage to synthesize vitamins under controlled conditions, but that, out of the many thousands of species of bacteria available, relatively few are usable. For example, after very extended experiment and research, I have discovered: that none of the twelve families of bacteria listed in "Bergey's Manual of Determinative Bacteriology" under the order of Eubacteriales, except the family of Enterobacteriaceae, is suitable; that, of this family, none of its five tribes except Eschericheae, is suitable; and that, of this tribe, none of its three genera, except Aerobacter, is suitable. I have discovered that normally both species, *aerogenes* and *cloacae*, of the genus Aerobacter will thrive in stillage without the addition of nutrients, and during fermentation will produce relatively large amounts of B-complex vitamins, and it is in such discovery that the present invention resides. With respect to the genus Aerobacter, I have found that normally both of its species, *aerogenes* and *cloacae*, will synthesize large amounts of B-complex vitamins in the stillage when the latter is fermented with or without the addition of a carbohydrate.

During my experiments in this field, more than ten different strains of *cloacae* and *aerogenes* were tried with success although one strain, *Aerobacter ocytocum*, was less successful than the others. There appears to be no known way of defining each of the different strains in terms sufficient to identify it separately and distinguish it from the other strains; hence there appears to be no known way of identifying or clearly distinguishing the less successful strain mentioned except in terms of its inability to synthesize vitamins of the B-complex to the marked extent achieved by the other strains. Furthermore, while I should normally expect other strains of the same species to possess vitamin synthesizing properties to a marked degree, since the one strain mentioned above has that property to a less extent that the others, there is always the possibility that still other strains may not possess such property to any significant extent because different strains often exhibit marked differences in some of their properties. This possibility of failure is not significant since, in practice, any strain would be thoroughly tested to ascertain the extent of its vitamin synthesizing property before being placed in practical or commercial use. Inasmuch as such tests are highly desirable and universally employed, I propose herein to distinguish the successful strains from the unsuccessful by using the word tested as a qualification of a successful bacteria, or, species or strain of bacteria, or culture thereof.

In carrying out my invention, the pH of deficient stillage is adjusted by an alkali compound, such as sodium hydroxide, to a range favoring the growth of the bacteria, sterilized to prevent contamination, inoculated with tested bacteria of the genus Aerobacter and then fermented under favorable, temperature and aeration conditions for a sufficient time. The pH of 5.5 to 6.5 is known to favor the growth of both species of bacteria of the genus Aerobacter; hence this range is employed for either species or for a mixture of both. The stillage may be sterilized in any suitable manner as, for example, by steam at 15 lbs. pressure for any appropriate interval of such time as 45 minutes prior to inoculation with the bacteria. Each 100 gallons of sterilized stillage may be inoculated with from 2 to 5 gallons of a culture of either species, or a mixed culture of both, which is produced in the normal way and preferably acclimatized by growing in stillage for 24 hours. When the stillage is inoculated, enough air is supplied to turn over or work the stillage sufficiently to prevent any settling action while the stillage is fermented for 48 to 72 hours at a temperature ranging between 84 and 98 degrees F. With a culture of *cloacae*, aeration may be omitted if desired.

At the end of the fermentation period the vitamin B-complex is usually found to have increased as much as 300% and in some instances even more. For example, in aerated stillage the *Aerobacter aerogenes* multiply the riboflavin content five fold and triple the pantothenic acid content, while *Aerobaceter cloacae* triple the riboflavin content in both aerated and unaerated stillage and quadruple the pantothenic acid content. Both species also synthesize other members of the B-complex including biotin, niacin, pyridoxin, thiamin, and folic acid.

Among the tested strains of bacteria successfully employed to synthesize vitamins to a marked degree are the following: of the species *aerogenes*, American Type Culture strains bearing numbers 129, 211, and 884 obtained from the Georgetown University collection at Washington, D. C., and numbers 115, 199, and 200 obtained from the Northern Regional Research Laboratories collection at Peoria, Illinois; and of the species *cloacae*, American Type Culture strains bearing numbers 222, 529, and 961 obtained from the same Georgetown University collection and number 126 obtained from the same Northern Regional Research Laboratories collection This data is given to illustrate and not limit the invention.

Having described my invention, I claim:

1. In the method of enriching stillage, the steps which comprise: inoculating with bacteria of the genus Aerobacter capable of synthesizing components of vitamin B-complex, a stillage produced by distilling off volatile products of fermentation from a fermented carbohydrate mash, and fermenting the inoculated stillage.

2. In the method of enriching stillage, the steps which comprise: inoculating with bacteria of the genus Aerobacter capable of synthesizing components of viatmin B-complex, a stillage produced by distilling off volatile products of fermentation from a fermented carbohydrate mash and removing insolubles, and fermenting the inoculated stillage.

3. In the method of enriching stillage the steps which comprise: inoculating with bacteria of the genus Aerobacter capable of synthesizing components of vitamin B-complex, a stillage produced by distilling off volatile products of fermentation from a fermented carbohydrate mash fermented with yeast to produce ethyl alcohol, and fermenting the inoculated stillage.

4. In the method of enriching stillage the steps which comprise: inoculation with bacteria of the genus Aerobacter capable of synthesizing components of vitamin B-complex, a stillage produced by distilling off volatile products of fermentation from a fermented carbohydrate mash fermented with yeast to produce ethyl alcohol, and removing insolubles, and fermenting the inoculated stillage.

5. In the method of enriching stillage, the steps which comprise: inoculating with a strain of *Aerobacter aerogenes* capable of synthesizing components of vitamin B-complex, a stillage produced by distilling off volatile products of fermentation from a fermented carbohydrate mash, and fermenting the inoculated stillage.

6. The method as defined in claim 7 in which the stillage is aerated during fermentation with the bacteria.

7. In the method of enriching stillage, the steps which comprise: inoculating with a strain of *Aerobacter cloacae* capable of synthesizing components of vitamin B complex, a stillage produced by distilling off volatile products of fermentation from a fermented carbohydrate mash, and fermenting the inoculated stillage.

8. In the method of enriching stillage, the steps which comprise: inoculating with bacteria of the genus Aerobacter capable of synthesizing components of vitamin B-complex, a stillage produced by distilling off volatile products of fermentation from a fermented carbohydrate mash and fermenting the inoculated stillage under aerobic conditions at a hydrogen ion concentration favoring the growth of said bacteria.

ARTHUR F. NOVAK.

REFERENCES CITED

The following references are of record in the file of this patent:

UNITED STATES PATENTS

| Number | Name | Date |
|---|---|---|
| 2,064,359 | Sheffer | Dec. 15, 1936 |
| 2,107,261 | Legg | Feb. 1, 1938 |
| 2,128,845 | Myers | Aug. 30, 1938 |
| 2,202,161 | Miner | May 28, 1940 |
| 2,297,671 | Yamasaki | Sept. 29, 1942 |
| 2,326,425 | Arzberger | Aug. 10, 1943 |

OTHER REFERENCES

O'Kane, Jour. Bacteriology, April, 1941, page 441.

Annual Review of Biochemistry, vol. XII, 1943, page 557.

Tittsler et al., Jour. Bacteriology, July 1941, pages 151, 152.